US008515023B2

(12) United States Patent
Schoenbach

(10) Patent No.: US 8,515,023 B2
(45) Date of Patent: Aug. 20, 2013

(54) REAL-TIME INTERPRETING SYSTEMS AND METHODS

(76) Inventor: Stanley F Schoenbach, Riverdale, NY (US)

( * ) Notice: Subject to any disclaimer, the term of this patent is extended or adjusted under 35 U.S.C. 154(b) by 825 days.

(21) Appl. No.: 12/655,519

(22) Filed: Dec. 31, 2009

(65) Prior Publication Data

US 2010/0112530 A1    May 6, 2010

Related U.S. Application Data

(63) Continuation-in-part of application No. 10/729,590, filed on Dec. 5, 2003, now abandoned, and a continuation-in-part of application No. 11/084,793, filed on Mar. 18, 2005.

(60) Provisional application No. 60/556,113, filed on Mar. 25, 2004.

(51) Int. Cl.
*H04M 11/00* (2006.01)

(52) U.S. Cl.
USPC .......................................... 379/52; 348/14.01

(58) Field of Classification Search
USPC .................. 379/35–52; 348/14.01; 704/235, 704/260, 269, 270.1
See application file for complete search history.

(56) References Cited

U.S. PATENT DOCUMENTS

| | | | |
|---|---|---|---|
| 6,594,688 B2 * | 7/2003 | Ludwig et al. | 709/204 |
| 6,690,932 B1 | 2/2004 | Barnier et al. | |
| 7,206,386 B2 * | 4/2007 | Clapp et al. | 379/52 |
| 2003/0069997 A1 * | 4/2003 | Bravin et al. | 709/250 |
| 2005/0086699 A1 * | 4/2005 | Hahn et al. | 725/106 |
| 2006/0026001 A1 * | 2/2006 | Bravin et al. | 704/270.1 |
| 2006/0167871 A1 * | 7/2006 | Sorenson et al. | 707/6 |
| 2007/0064090 A1 * | 3/2007 | Park et al. | 348/14.01 |

\* cited by examiner

*Primary Examiner* — Binh Tieu

(57) ABSTRACT

Systems, methods and computer program products for the provision and enabling of multi-language and sign language services in real-time are disclosed. System components include a call processing computer/server that receives requests and is in communication with other system components, a video server/computer for processing and relaying video images, user interface devices for making requests and receiving data transmitted between system components and service provider devices for responding to or satisfying requests received.

19 Claims, 3 Drawing Sheets

REAL-TIME INTERPRETING SYSTEMS AND METHODS

CROSS-REFERENCE TO RELATED APPLICATIONS

This Application claims priority to, the benefit of, and is related to, the following of Applicants' provisional application:

U.S. Provisional Patent Application No. 60/556,113 titled "Translation system," filed Mar. 25, 2004;

This Application claims priority to, the benefit of, and is a Continuation in part to the following of Applicants' applications:

U.S. Non-Provisional patent application Ser. No. 10/729,590, titled "Hospital bed table with a video display," filed on Dec. 5, 2003; and U.S. Non-Provisional patent application Ser. No. 11/084,793, titled "Method and system providing interpreting and other services from a remote location," filed on Mar. 18, 2005, all incorporated by reference herein in entirety.

BACKGROUND OF THE INVENTION

Field of the Invention

While the primary and official language in the United States is English, many people living here are fluent only in other languages. Frequently, these people have difficulty communicating in English at a time and place where exchanging information with others is crucial. For example, the inability to communicate is a serious problem for a patient in a hospital or other similar health care facility. Here, for obvious reasons, it is important that patients have the ability to communicate with a doctor or nurse. In the past, this problem was addressed by providing a live interpreter at the facility. However, providing such services tends to be very expensive. Moreover, most facilities have limited space and, therefore, providing interpreters for more than two or three languages is just not practical, even for only a couple of hours a day. Alternative systems have utilized two-way video conferencing system between the patient and the interpreter. However, the system must use a dedicated Integrated Services Dedicated Network (ISDN) line, and therefore is inflexible and may not be readily available. Therefore, the interpreting service can be provided only at sites that have an ISDN termination. Some hand-held and PC-based devices are available that use translation software to convert text from one language to another. However, these devices are not suitable because they are difficult to use, they tend to be inaccurate, are impersonal and process only written information. Besides, such devices fail to provide, inter alia, real-time sign language services.

As such, there is a need for a more accurate, efficient and convenient interpreting system for multi-language and sign-language services in real-time.

BRIEF DESCRIPTION OF THE INVENTION

The present invention overcomes the above-identified problems by providing methods, systems, and computer program products for the provision of multi-language interpretation and sign language services in real time.

BRIEF DESCRIPTION OF THE DRAWINGS

The features and advantages of aspects of the present invention will become more apparent from the detailed description set forth below when taken in conjunction with the claims and drawings, in which like reference numbers indicate identical or functionally similar elements. Additionally, the left-most digit of a reference number identifies the drawing in which the reference number first appears.

DETAILED DESCRIPTION

Figure 1:
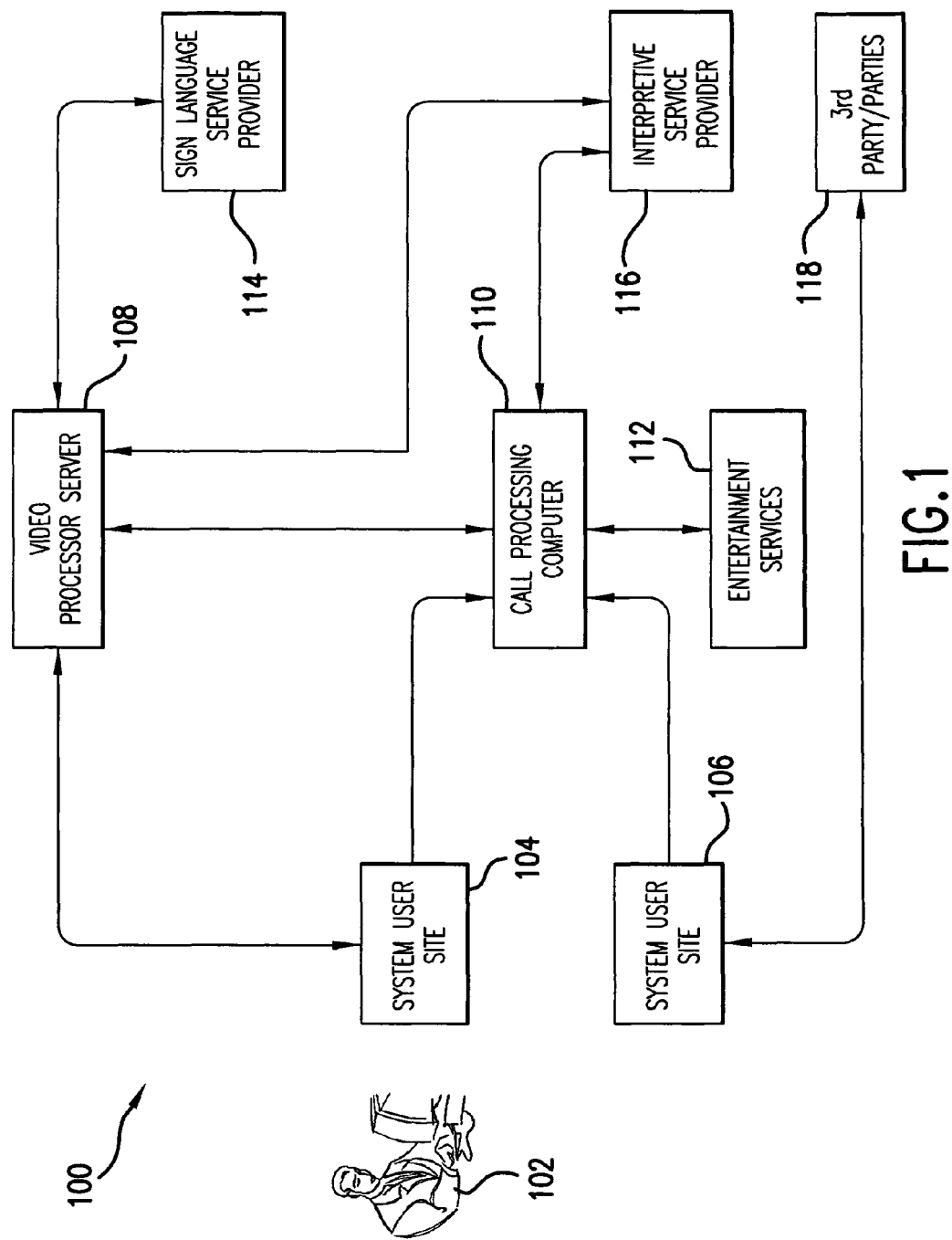
FIG. 1 is a system component & flow diagram showing an exemplary overview of a system according to an exemplary aspect of the present invention.

Aspects of the present invention are directed to systems, methods and computer program products for providing multi-language interpretation and sign language services in real time. In an aspect of the present invention, a system for multi-language interpretation and sign language services in real time is disclosed. Such a system, in one aspect, includes a call processing computer which may be used for establishing communication between one or more system users and one or more service providers. A service provider may include language interpreters and sign language specialists or interpreters. The system may also include a video processing server which is in operative communication or networked with the call processing computer. The video processing server may be capable of transmitting video images or live-feed video of system users and service providers in real-time. The system may further include one or more system user sites having a user interface device for use by system users. The user interface device may be linked, in operative communication or by network with the call processing computer. The user interface device may also be designed or configured to request one or more services such as interpreting services, sign language services, provision of entertainment options such as cable television, games etc. while in some instances also being able to receive the requested services. The user interface device may also be adapted or configured to request and receive entertainment services. The system may also include one or more interpreter interface devices which may also be in operative communication or networked with the call processing computer. The system may further include one or more sign language video devices also in operative communication or networked with the call processing computer.

An example of one such service may be for sign language interpreting services which may be requested by a system user. Once the call processing server or computer finds a suitable sign language interpreter, it displays the sign language interpreter at the system user's display device, while at the same time the sign language interpreter may be able to see the system user on his/her own display device.

In an aspect of the present invention, the call processing computer may include a directory module, for maintaining a real-time listing of one or more system users and one or more service providers; an authentication module for authenticating the one or more system user; a call routing module, for determining which said one or more service provider to call upon receiving a service request from said one or more system user; a call switching module for switching between calls; a call processing module for recording call parameters; and a reporting module for reporting call statistics.

In an aspect of the present invention, the call processing computer may be adapted or configured to add one or more additional parties to the communication between the one or more system user and the one or more service provider. For instance, a second interpreter/translator may be added to an ongoing translation session. The second interpreter may be added to further supplement the first interpreter or to provide additional interpreting services.

In an aspect of the present invention, the video processing server may include a compression module for compressing data; a decompression module for decompressing data; and an audio module for relaying and playing audio. Depending on the video or live feed being transmitted, these modules enable the video processing server/computer to process and relay data within the system.

In an aspect of the present invention the one or more interpreter interface devices and the sign language video devices may be in respective operative communication or networked with the video processing server. This, in one aspect, enables display of video on either device as transmitted to or from the video processing server.

In an aspect of the present invention, the call processing server may further include a secondary module for determining the one or more service provider's availability to satisfy a request; a video integration module for enabling the system's communication with video capable devices; a call distribution module for seeking a particular service provider; and an automated module for automating call recording, accounting and reporting. The video integration module may have code that enables the video processing server/computer to handle different video feed formats or data standards.

In an aspect of the present invention the call distribution module of the call processing computer may be further adapted or configured to restrict the search for a service provider based on the service provider's qualifications or by the one or more system user's request parameters.

In an aspect of the present invention the call processing module may be enabled to record the time the one or more system users is waiting for the one or more service provider to respond to a request.

In an aspect of the present invention the call processing module may be adapted to record the session time, the session time being the time duration for communication or session (i.e. for translation or interpreting services) between the one or more system user and the one or more service provider.

In yet another aspect of the present invention, computer program product for providing multi-language interpretation and sign language services in real time is disclosed. The computer program product, as envisioned in this aspect, may include a computer usable medium having control logic stored on it for causing a computer to provide multi-language interpretation and sign language services in real-time. The control logic may include computer readable program code means for a variety of operations including: establishing communication between one or more system users and one or more service providers, maintaining a real-time database of system users and service providers, authenticating system users, determining which one of the service providers to call upon, recording call parameters and reporting call statistics.

In yet another aspect of the present invention, the control logic may include computer readable program code means for adding more parties to the communication between the one or more system user and the service provider.

In yet another aspect of the present invention, the control logic may include computer readable program code means for determining the service provider's availability to satisfy a request, computer readable program code means for enabling the system's communication with video phones, computer readable program code means for searching for a specific service provider and computer readable program code means for automating call recording, accounting and reporting.

In yet another aspect of the present invention, the control logic may include computer readable program code means for restricting the search for a specific service provider based on the service provider's qualifications or by the one or more system user's request parameters.

In yet another aspect of the present invention, the control logic may include computer readable program code means for switching between calls.

In yet another aspect of the present invention, the control logic may include computer readable program code means for recording the session time, wherein the session time is the time duration for communication between the one or more system user and the service provider.

In a further aspect of the present invention, a method of providing multi-language interpretation and sign language services in real-time, which may utilize one or more computer servers for execution is disclosed. The method may include the steps of placing one or more service requests by one or more system users, determining the type service request, sending a command to one or more server based on the type of the one or more request, reviewing a real-time database of one or more sign language operator and one or more language interpreter that are available, searching the real-time database of one or more service provider, aggregating one or more search result obtained as a result of the search, and establishing a connection between the one or more search result and the one or more user.

In a further aspect of the present invention, service provider may be either a sign language operator or a language interpreter.

In a further aspect of the present invention, the method may include the steps of determining one or more service provider's availability to satisfy a request, enabling communication with video capable devices, searching for a particular service provider based on the service provider's qualifications, and automating call recording, accounting and reporting.

In a further aspect of the present invention, the method may include the step of restricting the search for the particular service provider. In one aspect, the search may be restricted by the system user's request parameters.

In a further aspect of the present invention, the method may include the step of recording the time the user is waiting for the one or more service provider to respond to the user's request.

In a further aspect of the present invention, the method may include the step of recording the session time, wherein the session time is the time duration for communication between the one or more user and the one or more service provider.

The terms "user", "system user", "client", "person", etc. are used to indicate any individual or group of individuals that may use the system or may be involved with the system according to an aspect of the present invention. They may include service providers such as medical practitioners, patients, court personnel, language interpreters, sign language translators, entertainment service providers etc.

Aspects of the present invention will now be described in more detail herein in terms of the above exemplary context and the accompanying figures. This description is for convenience only and is not intended to limit the application of aspects of the present invention. In fact, after reading the following description, it will be apparent to those skilled in the relevant art(s) how to implement aspects of the following invention in alternative ways.

Figure 2:
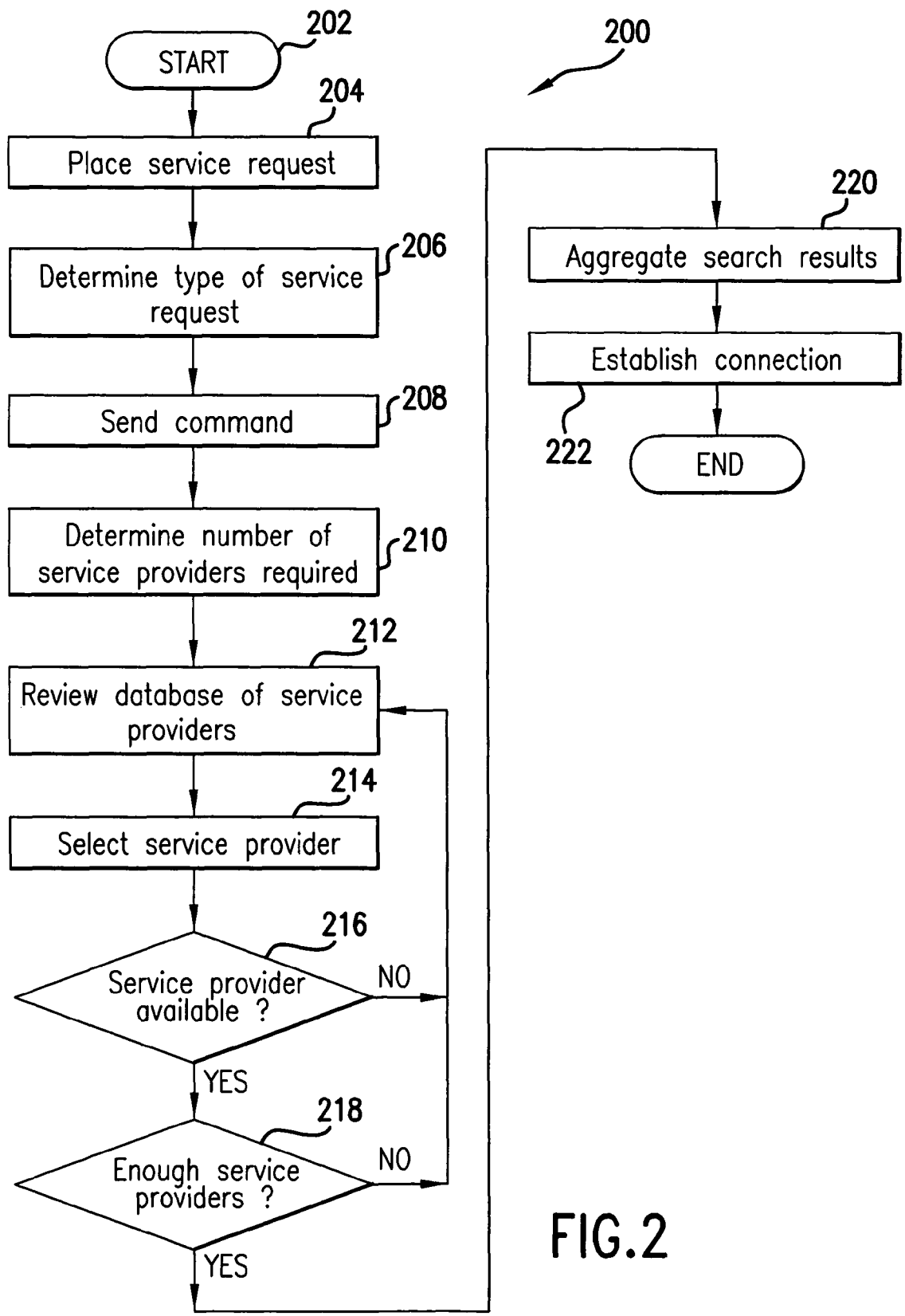
FIG. 2 is a flow chart showing a process of requesting services according to an exemplary aspect of the present invention.

Referring now to FIGS. 1 and 2 a system component & flow diagram showing an exemplary overview of a system 100 and flow charts showing a process of requesting services 200 all according to exemplary aspects of the present invention are respectively shown.

A system user 102 may access the system 100 via any one of system sites 104 or 106 using system equipment present at either location. In one aspect of the present invention, system user 102 may be a doctor at a doctor's office or at a hospital, where he/she is seeking to provide healthcare services to a patient requiring language interpretation. In another aspect of the present invention, system user 102 may be an actual patient admitted to a hospice or hospital needing language translation, interpreting or entertainment services. System user 102 may be a variety of individuals who need translation, interpretation and/or entertainment services at a variety of locations. This may also apply to areas where communication is crucial including, without limitation, court hearings, depositions or proceedings, emergency situations etc. In one aspect of the present invention, each user location may include a user interface device which is in communication with call processing computer 110. Each user interface device may be used by system user 102 for requesting the variety of services. System user 102 may place a service request in step 204 which, in one aspect of the present invention, may be a request for translation, interpretation or entertainment services etc. System user 102's request is then sent to call processing computer 110 which, in step 206 determines what kind of service has been requested. After determining the kind of service requested by the system user 102, call processing computer 110 then sends a request command to the appropriate destination. In one aspect of the present invention, if the request is for language interpretation, call processing computer 110 may send the request command to a number of service providers one of which may include an interpretive service provider site 116. Interpretive provider site 116 may have one or more interpreter interface device(s) 120 (not shown) which interpreters may use to access system 100 and also receive service requests sent. Call processing computer 110 may communicate with interpreter interface device(s) 120 for a variety of other functions, including providing and/or receiving requests for entertainment services or internet access etc.

In an aspect of the present invention, the service request made by system user 102 may require visual e.g. for sign language, in which case, call processing computer 110 may send the service request to video processing server/computer 108 which is enabled to receive and dispatch video services. In one aspect of the present invention, video processing server/computer 108 may include a number of modules for performing and enhancing its tasks in the system including: a compression module for compressing data, a decompression module for decompressing data and an audio module for relaying and playing audio. Video processing server/computer 108 may also be directly connected or in communication with sign language video device which may be located at sign language service provider site 114. In another aspect of the present invention, video processing server/computer 108 may be connected to or in communication with interpretive service provider 116 to assist in providing system user 102 with a visual or video of the services being provided.

In an aspect of the present invention, if the service request by system user 102 is for sign language interpretation, call processing computer 110 will route the request to sign language service provider site 114. In one aspect of the present invention, the service provider site(s) may include one or more sign language video device(s) which are enabled to relay the sign language interpretation to system user 102 through video server 108 or, in another aspect, directly to the user interface device. In yet another aspect, user interface device may be adapted or enabled to request and receive entertainment services. Examples of such services may include cable television, internet access & use etc.

In one aspect of the present invention, after sending the service requests or commands out in step 208, call processing computer 110 will determine, in step 210 how many service providers are needed to satisfy the service request. In another aspect of the present invention, call processing computer 110 may make this determination before sending out the service request command. If the service request is for sign language interpretive service, then call processing computer 110 will then contact video processing server/computer 108 and sign language service provider site 114. Call processing computer 110, in one aspect of the present invention, reviews a database of service providers in step 212 to ascertain the availability of service providers that may meet the requested service. After reviewing the database of service providers, call processing computer 110 in step 214 selects the appropriate service provider. In one aspect, call processing computer 110 may select the service provider from a list stored within its database. In another aspect, call processing computer 110 may select the service provider from another list not resident within call processing computer 110. Call processing computer 110 then determines, in step 216 whether the service provider(s) found in its earlier check is/are available to fulfill or respond to the service request. If the service provider(s) found is/are not available to answer or respond and fulfill the request, then call processing computer 110 will re-check its database of service providers, as in step 212, to find additional service providers or the next available service provider to respond to the service request. If the service provider is available, then call processing computer then determines, in step 218, whether there are an adequate number of providers for the requested service. If not, call processing computer 110 then goes back to the database as in step 212 to seek and obtain additional service provider(s). If there is an adequate number of service providers for the requested task or service at hand, call processing computer 110 then aggregates the results of its search in step 220 and establishes connection in step 222 between system user 102 and the service provider(s) available to respond or fulfil the system user's request.

In some instances, multiple interpreters may be required for a particular interpreting session. As such, in one aspect of the present invention, call processing computer 110 may be adapted or enabled to add one or more additional participants to an ongoing session. Call processing computer 110 may be able to do this in a number of ways, including having and executing control logic stored within its hardware or by software loaded onto call processing computer 110. Call processing computer 110 may additionally, in a yet further aspect of the present invention, include a secondary module for determining one or more service providers' availability to satisfy a request. In one aspect, each service provider may manually indicate his/her availability or unavailability. In another aspect, call processing computer 110 may determine a service provider is available by checking to see whether the service provider's communication lines are busy or whether they are online (over the interne or on the system). Call processing computer 110 may additionally include, in another aspect, a directory module for maintaining a real-time listing of one or more system users 102 and/or service providers; an authentication module for ensuring, in one aspect, that the system users 102 are authorized to use or have access to the system; a call routing module which determines which service provider to switch to upon receiving a call request from system user 102; a switching module for switching between sessions or calls or requests; a call processing module for recording and keeping track of call parameters such as length of session/call, time between request and response by service provider, etc.; and a reporting module to report call statistics and provide printed reports of same. The call processing module may be enabled or adapted to record the session time where the session time is the time duration during a call session between a system user 102 and one or more service providers.

Call processing computer 110, in one aspect of the present invention, may be enabled to perform tasks within the system by way of computer program product having control logic for causing a call processing computer 110 to operate within the system. The control logic may include computer readable program code or means for establishing communication between at least one system user and at least one service provider; maintaining a real-time database of system users and service providers; authenticating system users; determining which said at least one service provider to call upon; recording call parameters; and for reporting call statistics.

Additional control logic may include computer readable program code or means that enables the components of the system to add more parties to existing sessions between system user 102 and one or more of the service providers. In another aspect of the present invention, the control logic may also include computer readable program code that determines a service provider's ability to satisfy a request; enabling the system's and, in another aspect, the system's component's communication with video phones or similar devices; searching for a specific service provider; and automating call recording, accounting and reporting.

Further additional control logic, according to another aspect of the present invention, may include computer readable program code or means that may restrict a search for a specific service provider based on the service provider's qualifications or by parameters dictated by system user 102; code means for switching between calls made by various system users 102; and code means for recording the session time between a system users and a service provider. The session time may, in one aspect, be the time duration for communication between system user 102 and a service provider.

Figure 3:
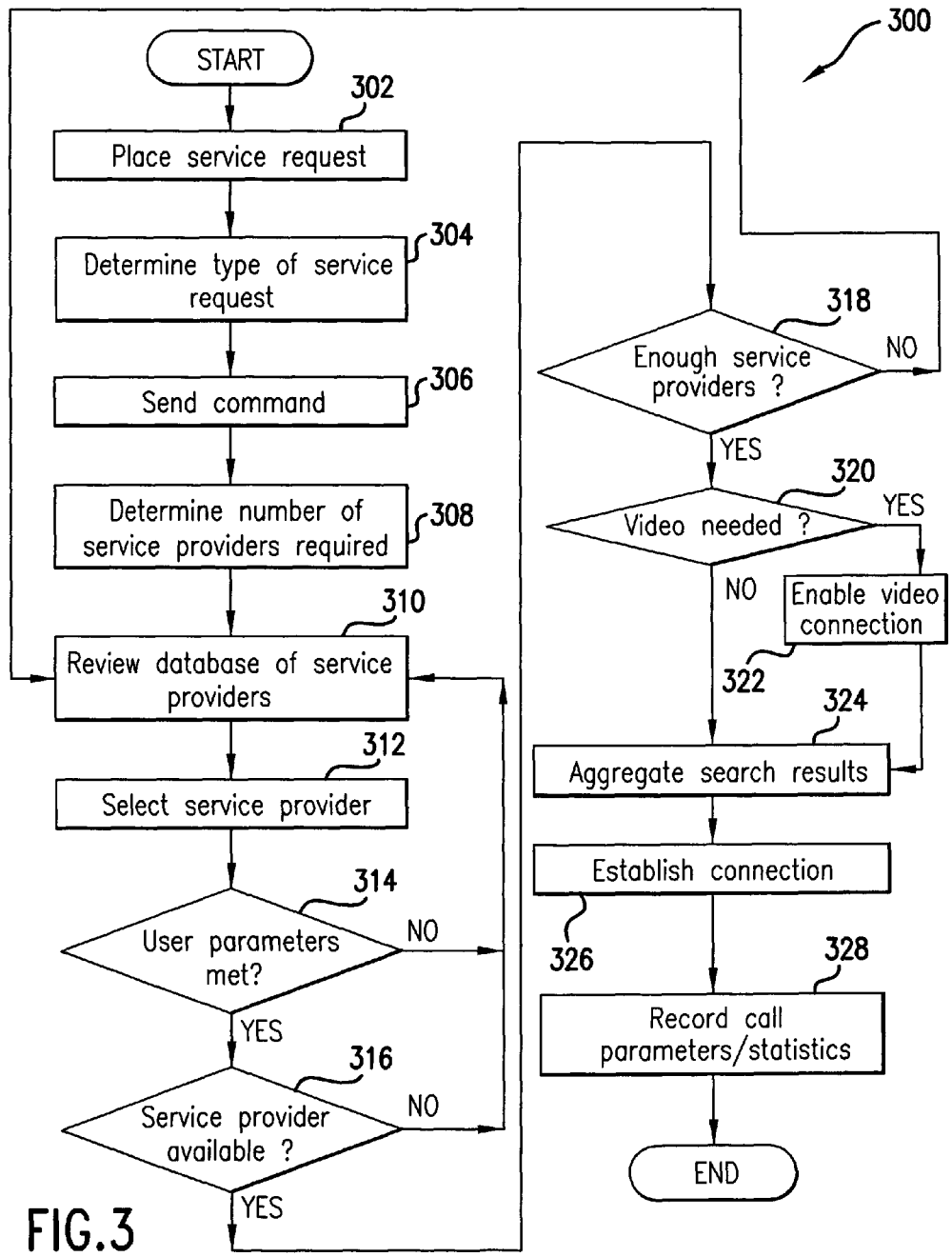
FIG. 3 is a flow chart showing a process of requesting services according to an exemplary aspect of the present invention.

Referring now to FIG. 3 a flow chart showing a process of requesting services according to an exemplary aspect of the present invention is shown. A system user 102 may access the system 100 via any one of system sites 104 or 106 using system equipment present at either location. In one aspect of the present invention, system user 102 may be a doctor at a doctor's office or at a hospital, where he/she is seeking to provide healthcare services to a patient requiring language interpretation. In another aspect of the present invention, system user 102 may be an actual patient admitted to a hospice or hospital needing entertainment services or interpretation services. System user 102 may be a variety of individuals who need interpretation and/or entertainment services at a variety of locations. In one aspect of the present invention, each user location may include a user interface device which is in communication with call processing computer 110. Each user interface device may be used by system user 102 for requesting the variety of services. System user 102 may place a service request in step 302 which, in one aspect of the present invention, may be a request for translation or entertainment services etc. The request is then sent to call processing computer 110 which, in step 304 determines what kind of service has been requested. After determining the kind of service requested by the system user 102, call processing computer 110 then sends a request command to the appropriate destination. In one aspect of the present invention, if the request is for language interpretation, call processing computer 110 may send the request command to a number of service providers one of which may include an interpretive service provider site 116. Interpretive provider site 116 may have one or more interpreter interface device(s) 120 (not shown) which interpreters may use to access system 100 and also receive service requests sent. Call processing computer 110 may communicate with interpreter interface device(s) 120 for a variety of other functions, including providing and/or receiving requests for entertainment services or interne access etc.

Prior to sending the service requests or commands out in step 308, call processing computer 110 will determine, in step 306 how many service providers are needed to satisfy the service request. In another aspect of the present invention, call processing computer 110 may make this determination before sending out the service request command. If the service request is for sign language interpretive service, then call processing computer 110 will then know to contact video processing server/computer 108 and sign language service provider site 114. Call processing computer 110, in one aspect of the present invention, reviews a database of service providers in step 310 to ascertain the availability of service providers that may meet the requested service. After reviewing the database of service providers, call processing computer 110 in step 312 selects the appropriate service provider. In one aspect, call processing computer 110 may select the service provider from a list stored within its database. In another aspect, call processing computer 110 may select the service provider from another list not resident within call processing computer 110. Call processing computer 110 then determines, in step 314 whether search parameters for a service provider are met. The search parameters, in one aspect may, include without limitation: the type of language needed to be translated, the experience of the translator being provided by the service provider, the gender of the translator being provided by the service provider, etc. Search parameters, in another aspect, may be set by system user 102 or automatically sent by call processing computer 110 based on needs of the particular system site 104 and/or 106.

Once call processing computer 110 determines that all search parameters have been met, call processing computer 110 then determines in step 316 whether the service provider satisfying the parameters are available. Call processing computer 110 then in step 318 determines whether there are enough service providers found to help respond to the system user 102's request. If not, call processing computer 110 reverts back to step 310 to review the database for additional service providers needed to fulfill the request.

If the appropriate number of service providers has been found, call processing computer 110 then determines whether in step 320, video is needed for the requested service. If video is required, call processing computer 110 then enables communication in step 322 with video processing server/computer 108 thus enabling the display and transmission of video images. In one aspect of the present invention, call processing computer may be bypassed by system user 102 at system user site 104—whereby the system user may be able to communicate directly with video processing server/computer 108 and receive his/her services through video processing server/computer 108. In a further aspect of the present invention, video processing server/computer 108 may be a module within call processing computer 108.

If video is not required in step 320, call processing computer 110 in step 324 aggregates the search results of its search for service providers and then establishes the connection, in step 326, between system user 102 and the service providers selected and found by call processing computer 110. In one aspect of the present invention, call processing computer 110, by way of computer program product resident on its hardware or installed by software, may in step 328, begin recording call parameters and/or statistics between components of system 300 e.g. the communication session between system user 102 and service provider. Call processing computer 110 may also record the call duration, response time for a service provider to respond to a request etc.

The system components may communicate with each other in a variety of ways or through a variety of media. In one aspect of the present invention, where possible, the system components may communication via telephone connections. In another aspect, the system components may communicate via high speed connections such as broadband connections and the like. In another aspect, where possible, the system components may communicate via internet telephony or internet connections.

While various aspects of the present invention have been described above, it should be understood that they have been presented by way of example, and not limitation. It will be apparent to persons skilled in the relevant art(s) that various changes in form and detail can be made therein without departing from the spirit and scope of aspects of the present invention. Thus, aspects of the present invention should not be limited by any of the above described exemplary aspects, but should be defined only in accordance with the following claims and their equivalents.

In addition, it should be understood that the figures in the attachments, which highlight the structure, methodology, functionality and advantages of aspects of the present invention, are presented for example purposes only. Aspects of the present invention are sufficiently flexible and configurable, such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of aspects of the present invention in any way.

What is claimed is:

1. A system for providing multi-language interpretation and sign language services in real-time comprising:
   a call processing computer for establishing communication between at least one system user and at least one service provider, wherein said call processing computer further comprises a directory module, for maintaining a real-time listing of at least one system user and at least one service provider, an authentication module for authenticating said at least one system user, a call routing module, for determining which said at least one service provider to call upon receiving a service request from said at least one system user, a call switching module for switching between calls, a call processing module for recording call parameters, a reporting module for reporting call statistics, a secondary module for determining said at least one service provider's availability to satisfy a request, a video integration module for enabling said system's communication with video capable devices, a call distribution module for seeking a particular service provider and an automated module for automating call recording, accounting and reporting;
   a video processing server in operative communication with said call processing computer;
   at least one system user site having a user interface device for said at least one system user, wherein said user interface device is in operative communication with said call processing computer and wherein said user interface device may be used for requesting at least one service;
   at least one interpreter interface device in operative communication with said call processing computer; and
   at least one sign language video device in operative communication with said call processing computer.

2. The system of claim 1, wherein said at least one user interface device is adapted to request and receive interpreting or entertainment services.

3. The system of claim 1, wherein said call processing computer is adapted to add at least one additional party to said communication between said at least one system user and said at least one service provider.

4. The system of claim 1, wherein said video processing server comprises of:
   a. a compression module for compressing data;
   b. a decompression module for decompressing data; and
   c. an audio module for relaying and playing audio.

5. The system of claim 1, wherein said at least one interpreter interface device and said sign language video device are in respective operative communication with said video processing server.

6. The system of claim 1, wherein said call distribution module is further adapted to restrict the search for a service provider based on said service provider's qualifications or by said at least one system user's request parameters.

7. The system of claim 1, wherein said call processing module is enabled to record the time said at least one system user is waiting for said at least one service provider to respond to a request.

8. The system of claim 1, wherein said call processing module is adapted to record the session time, wherein the session time is the time duration for communication between said at least one system user and said at least one service provider.

9. A computer program product comprising a computer usable medium having control logic stored therein for causing a computer to provide multi-language interpretation and sign language services in real-time, said control logic comprising:
   first computer readable program code means for establishing communication between at least one system user and at least one service provider;
   second computer readable program code means for maintaining a real-time database of system users and service providers;
   third computer readable program code means for authenticating system users;
   fourth computer readable program code means for determining which said at least one service provider to call upon;
   fifth computer readable program code means for recording call parameters; and
   sixth computer readable program product for reporting call statistics;
   seventh computer readable program code means for adding more parties to said communication between said at least one system user and said service provider;
   eighth computer readable program code means for determining said service provider's availability to satisfy a request;

ninth computer readable program code means for enabling said system's communication with video phones;

tenth computer readable program code means for searching for a specific service provider; and eleventh computer readable program code means for automating call recording, accounting and reporting.

10. The computer program product of claim 9, further comprising twelfth computer readable program code means for restricting said search for a specific service provider based on said service provider's qualifications or by said at least one system user's request parameters.

11. The computer program product of claim 9, further comprising computer readable program code means for switching between calls.

12. The computer program product of claim 9, further comprising computer readable program code means for recording the session time, wherein said session time is the time duration for communication between said at least one system user and said service provider.

13. A method of providing multi-language interpretation and sign language services in real-time, utilizing at least one computer server for execution, comprising
 a. placing at least one service request by at least one user;
 b. determining the type of said at least one service request;
 c. sending a command to at least one server based on the type of said at least one request;
 d. reviewing a real-time database of at least one sign language operator and at least one language interpreter that are available;
 e. searching said real-time database of at least one service provider;
 f. aggregating at least one search result obtained as a result of said search; and
 g. establishing a connection between said at least one search result and said at least one user.

14. The method of claim 13, wherein said at least one service provider is a sign language operator.

15. The method of claim 13, wherein said at least one service provider is a language interpreter.

16. The method of claim 13 further comprising:
 a. determining said at least one service provider's availability to satisfy a request;
 b. enabling communication with video capable devices;
 c. searching for a particular service provider based on said service provider's qualifications;
 d. automating call recording, accounting and reporting.

17. The method of claim 16, further comprising restricting the search for said particular service provider, wherein said search is restricted by said user's request parameters.

18. The method of claim 16, further comprising recording the time said user is waiting for said at least one service provider to respond to said user's request.

19. The method of claim 16, further comprising recording the session time, wherein said session time is the time duration for communication between said at least one user and said at least one service provider.

* * * * *